(12) United States Patent
Hedtke

(10) Patent No.: US 8,851,496 B2
(45) Date of Patent: Oct. 7, 2014

(54) MOTORCYCLE HAVING A MULTI-PIECE FRAME ASSEMBLY

(75) Inventor: Joshua Hedtke, Brookfield, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 1010 days.

(21) Appl. No.: 12/173,964

(22) Filed: Jul. 16, 2008

(65) Prior Publication Data

US 2010/0012415 A1   Jan. 21, 2010

(51) Int. Cl.
*B62K 11/02* (2006.01)
*B62K 19/24* (2006.01)
*B62K 11/04* (2006.01)

(52) U.S. Cl.
CPC ............... *B62K 11/04* (2013.01); *B62K 19/24* (2013.01); *B62K 11/02* (2013.01)
USPC .......................... 280/281.1; 180/219; 280/785

(58) Field of Classification Search
CPC ........ B62K 11/00; B62K 11/02; B62K 11/04; B62K 2015/001; B62D 21/12
USPC ................... 180/227, 219; 280/785, 781, 782
See application file for complete search history.

(56) References Cited

U.S. PATENT DOCUMENTS

| | | | |
|---|---|---|---|
| 1,565,624 A | 12/1925 | Chilton | |
| 2,408,907 A * | 10/1946 | Booth | 403/380 |
| 2,445,058 A * | 7/1948 | Fields | 180/335 |
| 3,872,944 A | 3/1975 | Shapiro et al. | |
| 3,945,463 A * | 3/1976 | Okano et al. | 184/6.13 |
| 4,139,072 A | 2/1979 | Dawson | |
| 4,461,366 A | 7/1984 | Honda | |
| 4,485,884 A | 12/1984 | Fukunaga et al. | |
| 4,500,101 A | 2/1985 | Aoki | |
| 4,556,119 A | 12/1985 | Shiratsuchi | |
| 4,660,854 A | 4/1987 | Suzuki et al. | |
| 4,805,716 A | 2/1989 | Tsunoda et al. | |

(Continued)

FOREIGN PATENT DOCUMENTS

| | | |
|---|---|---|
| JP | S59-020780 | 2/1984 |
| JP | 04002584 A * | 1/1992 |

(Continued)

OTHER PUBLICATIONS

Office Action from the Japan Patent Office for Application No. 2009-166515 dated Aug. 6, 2013 (8 pages).

(Continued)

*Primary Examiner* — Tony H. Winner
*Assistant Examiner* — Wesley Potter
(74) *Attorney, Agent, or Firm* — Michael Best & Friedrich LLP

(57) ABSTRACT

A motorcycle includes a first frame having a steering head and a first mount, an engine-transmission assembly coupled to the first frame, a steering assembly pivotably coupled to the steering head, a front wheel rotatably coupled to the steering assembly, a swing arm assembly pivotably coupled to the first frame, a rear wheel rotatably coupled to the swing arm assembly, a second frame having a second mount coupled to the first mount with a threaded fastener, and a suspension component having a first end coupled to the swing arm assembly and a second end coupled to the second frame. Forces exerted by the suspension component on the first frame are directed through the second frame and the second mount.

29 Claims, 8 Drawing Sheets

(56) References Cited

U.S. PATENT DOCUMENTS

| | | | |
|---|---|---|---|
| 5,025,883 | A | 6/1991 | Morinaka et al. |
| 5,248,012 | A | 9/1993 | Kurawaki et al. |
| 5,284,221 | A | 2/1994 | Warne |
| 5,377,776 | A | 1/1995 | Saiki |
| 5,487,443 | A | 1/1996 | Thurm |
| 5,704,442 | A | 1/1998 | Okazaki et al. |
| D394,234 | S | 5/1998 | Gogan et al. |
| 5,845,728 | A | 12/1998 | Itoh et al. |
| 5,921,339 | A | 7/1999 | Matsuura |
| 5,984,336 | A | 11/1999 | Hanafusa et al. |
| 6,003,628 | A | 12/1999 | Jurrens et al. |
| 6,073,948 | A | 6/2000 | Motojima et al. |
| 6,257,362 | B1 | 7/2001 | Scherbarth |
| 6,290,015 | B1 | 9/2001 | Horii et al. |
| 6,290,017 | B1 | 9/2001 | Ito |
| 6,412,856 | B1 * | 7/2002 | Kajikawa et al. ........ 296/203.01 |
| 6,446,996 | B1 | 9/2002 | Horii |
| 6,575,259 | B2 | 6/2003 | Buell et al. |
| 6,702,058 | B2 * | 3/2004 | Ishii et al. ..................... 180/311 |
| 6,846,018 | B2 | 1/2005 | Dennert et al. |
| 2002/0117843 | A1 * | 8/2002 | Rasidescu et al. ............ 280/781 |
| 2003/0164257 | A1 | 9/2003 | Soileau |
| 2004/0035623 | A1 | 2/2004 | Fecteau et al. |
| 2006/0060407 | A1 | 3/2006 | Siddle |
| 2006/0096798 | A1 * | 5/2006 | Yamada et al. ................ 180/230 |
| 2007/0012500 | A1 * | 1/2007 | Brown et al. .................. 180/219 |

FOREIGN PATENT DOCUMENTS

| | | |
|---|---|---|
| JP | 05124562 A * | 5/1993 |
| JP | H11-278346 | 10/1999 |
| JP | 2004-067078 | 3/2004 |
| JP | 2007-62601 | 3/2007 |
| WO | 2007052298 | 5/2007 |

OTHER PUBLICATIONS

Japanese Patent Office Action for Application No. 2009-166515 dated Apr. 8, 2014 (8 pages—Including English Translation).

* cited by examiner

MOTORCYCLE HAVING A MULTI-PIECE FRAME ASSEMBLY

FIELD OF THE INVENTION

The present invention relates to motorcycles, and more particularly to motorcycle frames.

BACKGROUND OF THE INVENTION

Motorcycle frames are typically configured as one-piece, welded structures to which several components of the motorcycle (e.g., an engine, transmission, steering components, suspension components, etc.) are attached. In a motorcycle incorporating a rear swing arm, for example, a strut or shock absorber is typically mounted between the swing arm and a rear portion of the unitary frame. Because motorcycle frames are typically configured as one-piece unitary structures, subtle changes to the design of the motorcycle (e.g. modifying the motorcycle to incorporate a larger-width rear tire) typically require a complete redesign of the frame.

SUMMARY OF THE INVENTION

The present invention provides, in one aspect, a motorcycle including a first frame having a steering head and a first mount, an engine-transmission assembly coupled to the first frame, a steering assembly pivotably coupled to the steering head, a front wheel rotatably coupled to the steering assembly, a swing arm assembly pivotably coupled to the first frame, a rear wheel rotatably coupled to the swing arm assembly, a second frame having a second mount coupled to the first mount with a threaded fastener, and a suspension component having a first end coupled to the swing arm assembly and a second end coupled to the second frame. Forces exerted by the suspension component on the first frame are directed through the second frame and the second mount.

The present invention provides, in another aspect, a motorcycle frame including a first frame portion having a steering head, at least one longitudinal frame member extending rearwardly from the steering head, a first mounting portion coupled to the longitudinal frame member and having a recess, and a second mounting portion coupled to the longitudinal frame member and having a projection. The motorcycle frame also includes a second frame portion fastened to the first frame portion. The second frame portion includes a first coupling portion having a projection at least partially received within the recess of the first mounting portion, and a second coupling portion having a recess into which the projection of the second mounting portion is at least partially received.

The present invention provides, in yet another aspect, a motorcycle frame including a first frame portion having a steering head, at least one longitudinal frame member extending rearwardly from the steering head, a first mounting portion coupled to the longitudinal frame member, and a second mounting portion coupled to the longitudinal frame member. The first and second mounting portions have respective inboard surfaces in facing relationship with each other and respective outboard surfaces. The motorcycle frame also includes a second frame portion fastened to the first frame portion. The second frame portion includes a first coupling portion engaged with the outboard surface of the first mounting portion, and a second coupling portion engaged with the inboard surface of the second mounting portion.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
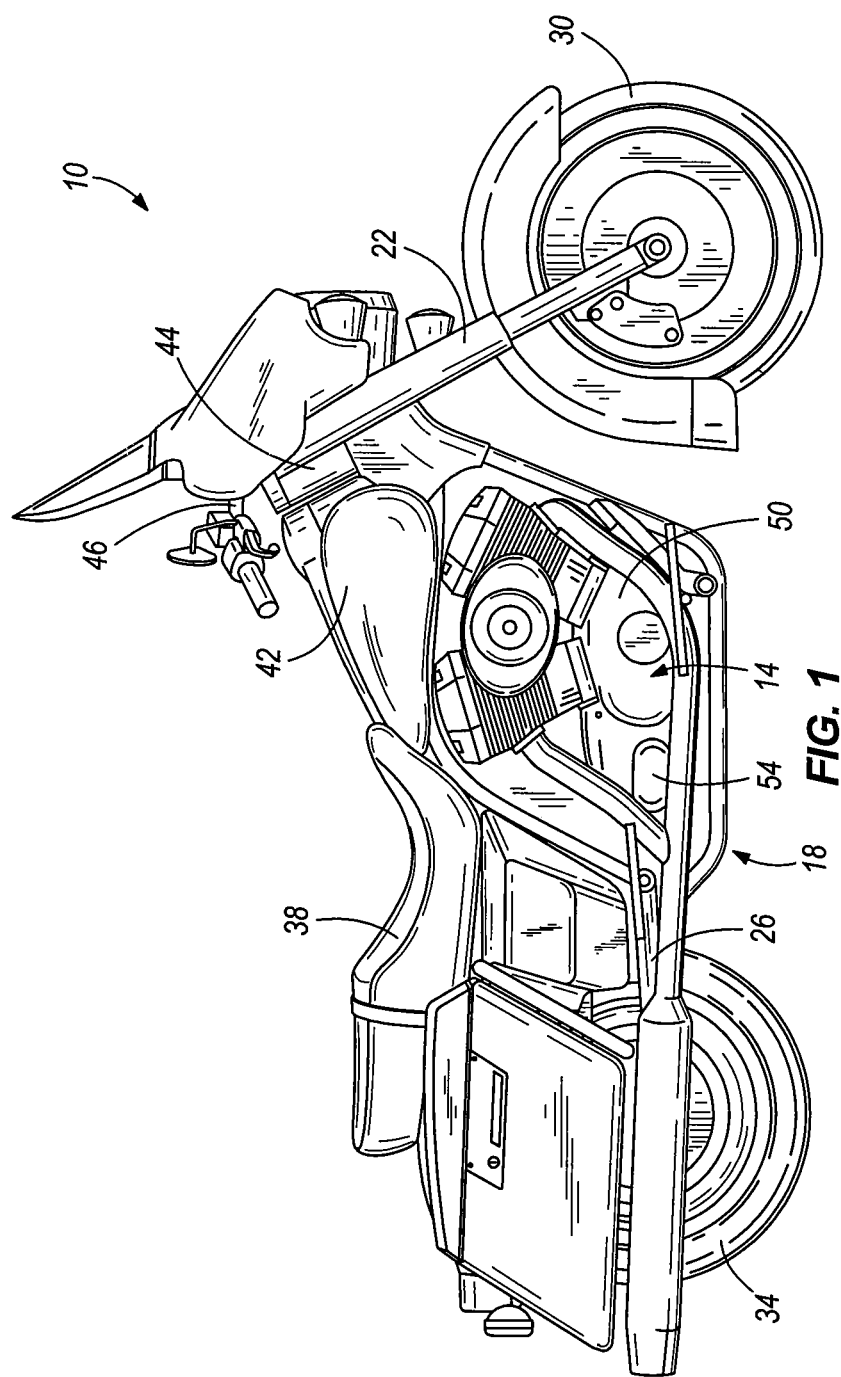
FIG. 1 is a side view of a motorcycle incorporating a multi-piece frame of the present invention.

FIG. 1 illustrates a motorcycle 10 including an engine-transmission assembly 14, a multi-piece frame 18, a front fork assembly 22, a swing arm or rear fork assembly 26, a front wheel 30, a rear wheel 34, a seat 38, and a fuel tank 42. The frame 18 supports the engine-transmission assembly 14, the front fork assembly 22, the rear fork assembly 26, the seat 38, and the fuel tank 42. The frame 18 includes a steering head 44 that pivotally supports the front fork assembly 22, which, in turn, supports the front wheel 30. The front fork assembly 22 includes a pair of handlebars 46 for steering the motorcycle 10. The rear fork assembly 26 is coupled to the frame 18 at a rear end of the motorcycle 10 and rotatably supports the rear wheel 34. The seat 38 is coupled to the frame 18 and is configured for supporting a rider. The fuel tank 42 is supported by the frame 18 and provides fuel to the engine-transmission assembly 14.

The engine-transmission assembly 14 is coupled to the frame 18 beneath the seat 38 between the front wheel 30 and the rear wheel 34 of the motorcycle 10. With continued reference to FIG. 1, the engine-transmission assembly 14 includes an engine 50 and a transmission 54, which comprise distinct, independent components of the engine-transmission assembly 14. The engine 50 comprises a V-twin engine 50 supported by the frame 18 forward of the transmission 54. The engine 50 includes an output shaft (not shown), such as a crankshaft, which includes a primary drive sprocket (not shown) for driving a primary chain (not shown) in a conventional manner to power the transmission 54.

Figure 2:
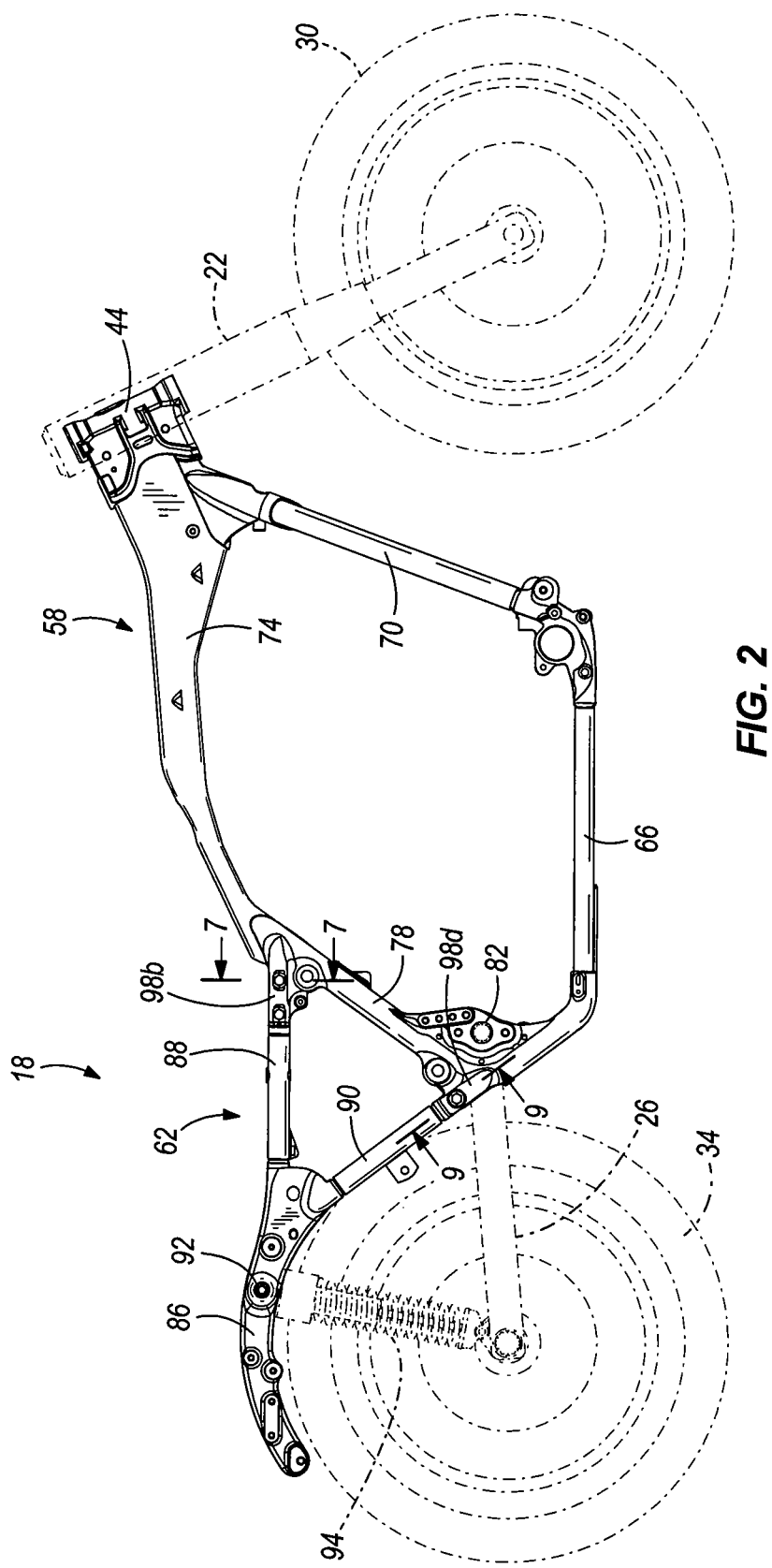
FIG. 2 is a side view of the multi-piece frame of FIG. 1.
Figure 3:
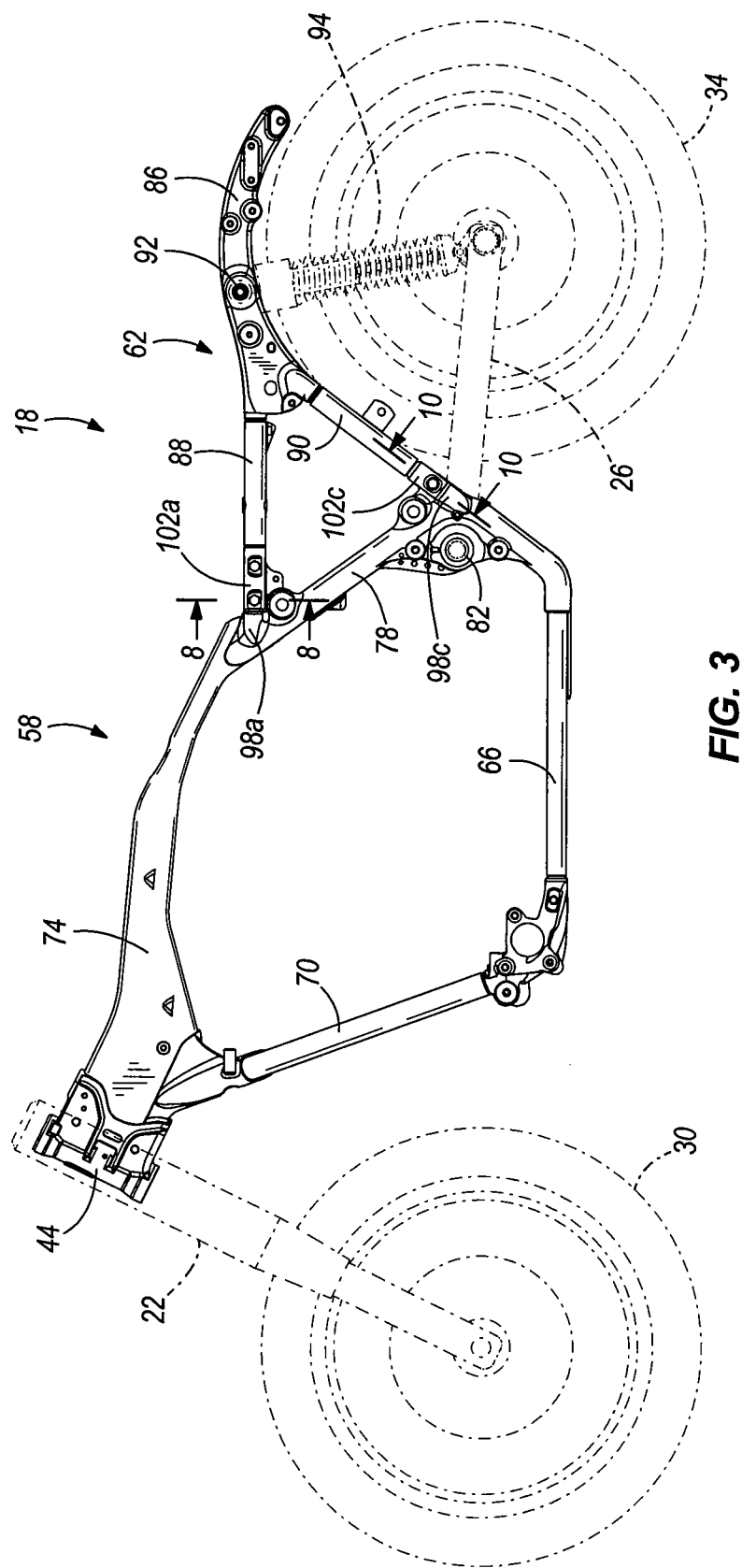
FIG. 3 is an opposite side view of the multi-piece frame of FIG. 2.
Figure 4:
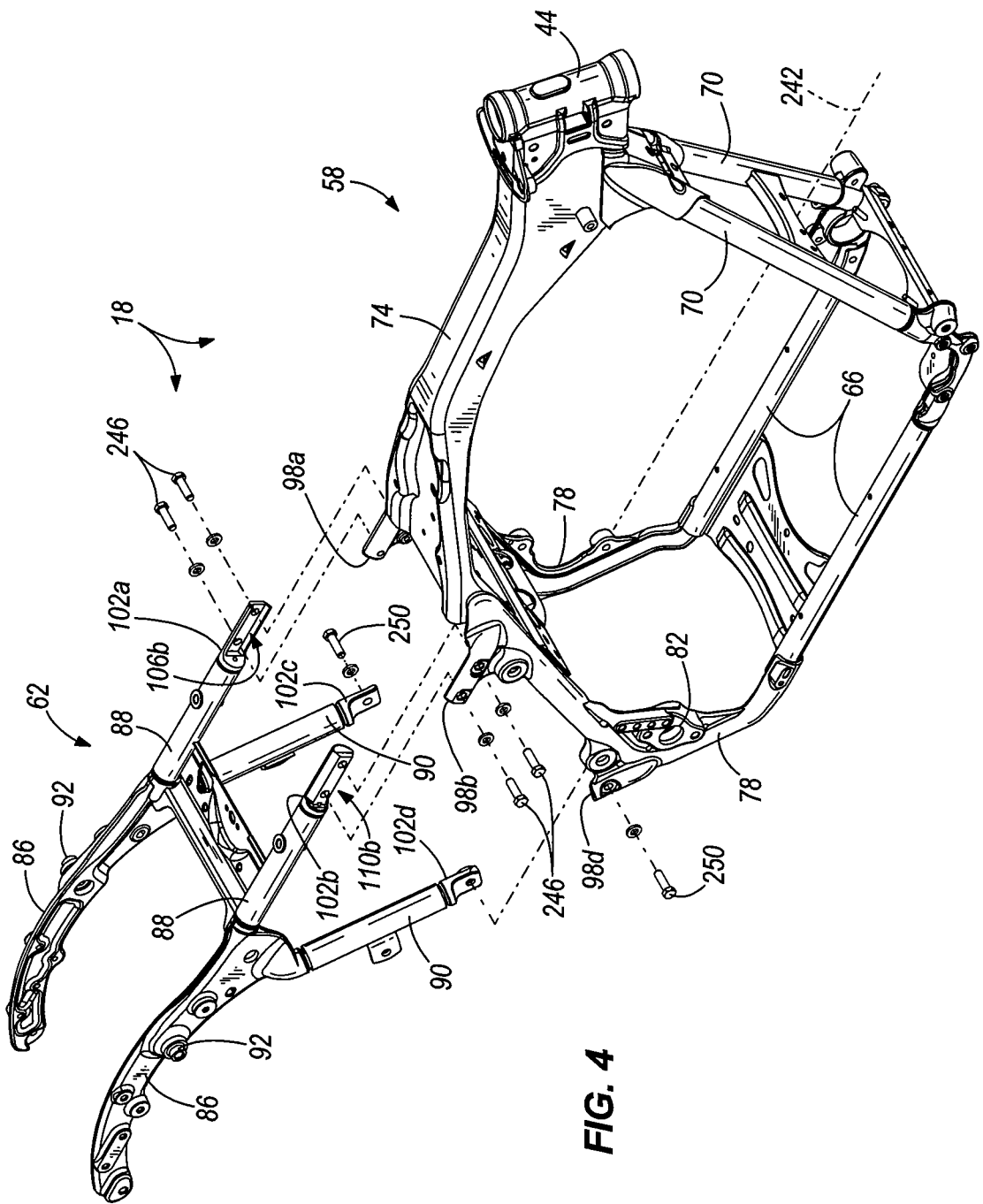
FIG. 4 is an exploded perspective view of the multi-piece frame of FIG. 2.

With reference to FIGS. 2-4, the multi-piece frame 18 includes a first or main frame 58 and a second or tail frame 62 fastened to the main frame 58. The main frame 58 includes the steering head 44, a pair of substantially longitudinal frame members 66 configured to support the engine-transmission assembly 14, a pair of down-tubes 70 extending between the steering head 44 and the longitudinal frame members 66, and a frame backbone 74. The main frame 58 also includes a pair of rear frame members 78 extending between the longitudinal frame members 66 and the frame backbone 74. In the illustrated construction of the multi-piece frame 18, the rear frame members 78 are forgings that are welded to the longitudinal frame members 66 and other portions of the frame 58 (e.g., the frame backbone 74). The rear frame members 78 also each include a pivot 82 configured to receive a swingarm axle and bearings (not shown) for pivotably mounting the swing arm or rear fork assembly 26. Alternatively, the rear frame members 78 may be made from any appropriate process such as a casting process, or the rear frame members 78 may comprise a rear portion of the main frame 58 that does not support the swing arm or rear fork assembly 26. As a further alternative, the main frame 58 may have any of a number of different configurations.

The tail frame 62 includes dual supports 86, a longitudinal frame member 88 extending from each support 86 in a direction substantially parallel with the longitudinal frame members 66, and a diagonal frame member 90 extending from each support 86 defining an oblique included angle with the longitudinal frame member 88. In the illustrated construction of the multi-piece frame 18, the supports 86 are forgings to which the frame members 88, 90 are welded. Alternatively, the supports 86 may be integrally formed as a single piece with the frame members 88, 90. With reference to FIG. 4, each of the supports 86 includes a mounting boss 92 to which one end of a suspension component 94 (e.g., a strut) is mounted (see also FIGS. 2 and 3). The other end of the suspension component 94 is mounted in a conventional manner to the rear fork assembly 26. As such, the suspension loading or the forces exerted by the upper end of the suspension component 94 pass through the tail frame 62 before being transferred to or reaching the main frame 58. Each of the supports 86 also includes additional mounting bosses (not labeled) to which other components of the motorcycle 10 (e.g., a rear fender, saddle bags, sissy bars, back rests, passenger seats, etc.) may be coupled.

Figure 5:
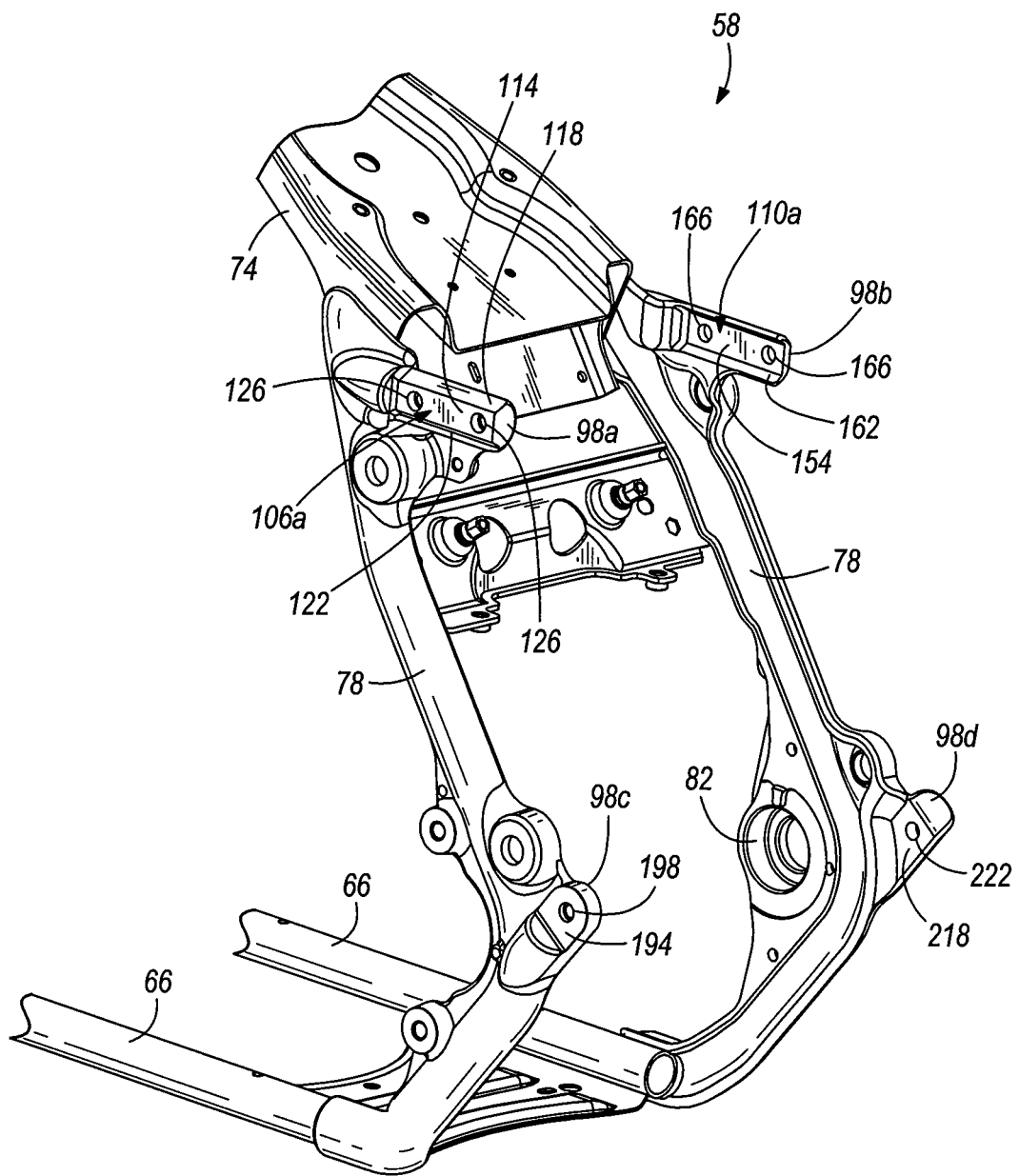
FIG. 5 is an enlarged perspective view of a rear portion of a first frame of the multi-piece frame of FIG. 2.

With reference to FIGS. 4 and 5, the main frame 58 includes a plurality of mounts 98a-98d, and the tail frame 62 includes a plurality of mounts 102a-102d that engage the respective mounts 98a-98d of the main frame 58. As shown in FIGS. 2 and 3, two of the mounts 98a, 98b on the main frame 58 extend in a direction substantially parallel with the longitudinal frame members 66, while the remaining mounts 98c, 98d on the main frame 58, respectively, extend upwardly from the rear frame members 78 at an oblique angle relative to the longitudinal frame members 66. Alternatively, the mounts 98a-98d may be oriented on the main frame 58 in any of a number of different ways to connect to the tail frame 62.

With reference to FIGS. 4 and 5, the mount 98a on the main frame 58 includes a mounting portion 106a, configured as a projection, and the corresponding mount 102a on the tail frame 62 includes a coupling portion 106b, configured as a recess, into which the mounting portion 106a is at least partially received. Further, the mount 98b on the main frame 58 includes a mounting portion 110a, configured as a recess, and the corresponding mount 102b on the tail frame 62 includes a coupling portion 110b, configured as a projection, at least partially received within the mounting portion 110a. Alternatively, the locations of the mounting portions 106a, 110a may be reversed, and the locations of the coupling portions 106b, 110b may be reversed to correspond with the reversed mounting portions 106a, 110a. Also, the main frame 58 may alternatively include only a single mounting portion 106a, or 110a or more than two mounting portions 106a, 110a. Likewise, the tail frame 62 may alternatively include only a single coupling portion 106b, 110b or more than two coupling portions 106b, 110b.

With reference to FIG. 5, the mounting portion 106a includes a substantially planar mounting face or surface 114, a wall 118 extending from a top edge of the mounting surface 114 at an oblique angle with respect to the mounting surface 114, and a wall 122 extending from a bottom edge of the mounting surface 114 at an oblique angle with respect to the mounting surface 114. As previously described, the mounting portion 106a is configured as a projection, such that the walls 118, 122 face outwardly on the mount 98a. In the illustrated construction of the mounting portion 106a, the mounting surface 114 and the wall 118 share a common top edge, and the mounting surface 114 and the wall 122 share a common bottom edge. Alternatively, the mounting portion 106a may be configured to include a blended surface between the mounting surface 114 and the wall 118, and a blended surface between the mounting surface 114 and the wall 122, respectively. The mounting portion 106a also includes dual apertures 126 extending through the mount 98a. Each aperture 126 includes a threaded bore 130 spaced axially inwardly from the mounting surface 114 and a counter-bore 134 extending between the threaded bore 130 and the mounting surface 114 (see FIG. 8).

Figure 6:
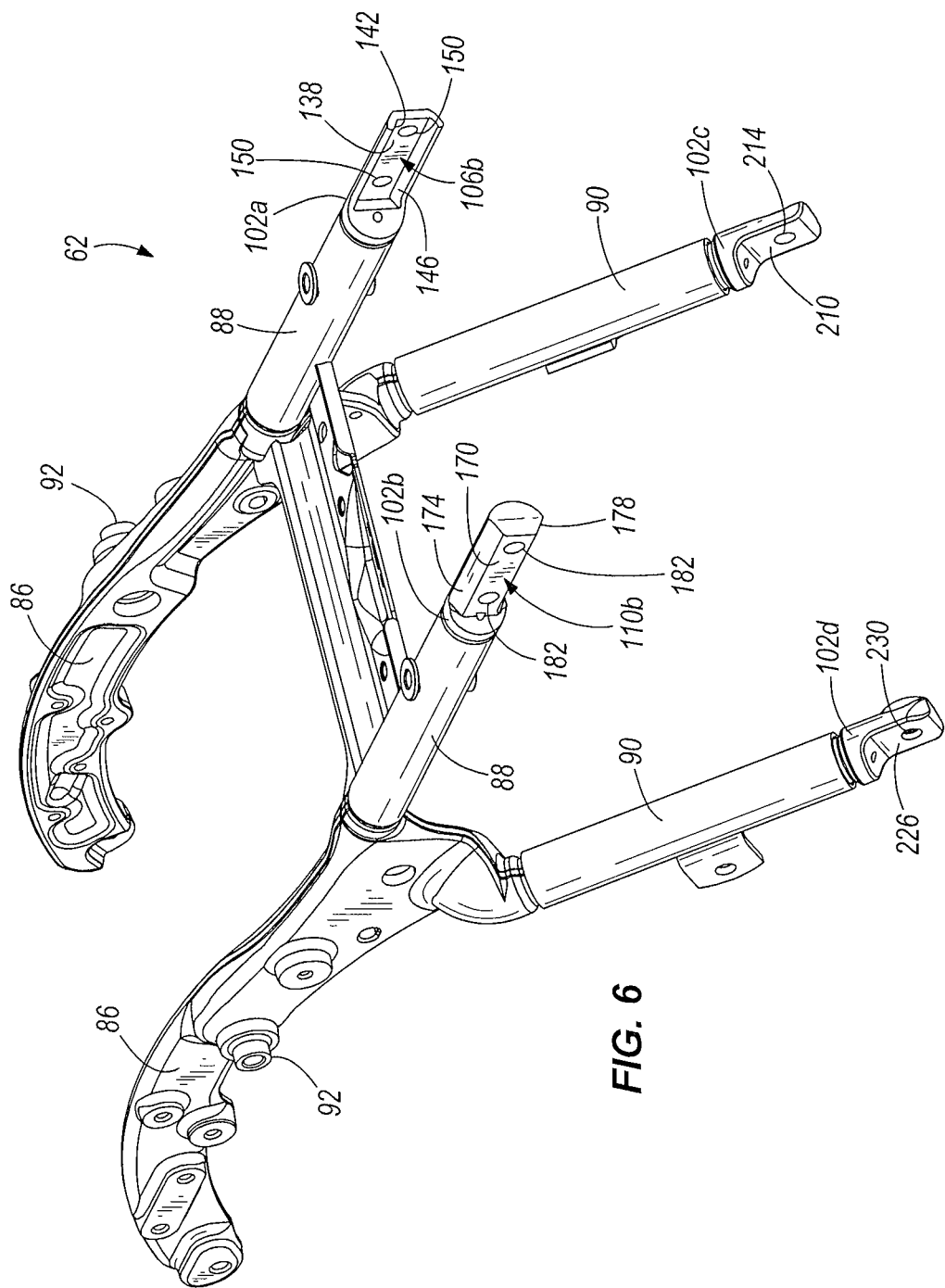
FIG. 6 is an enlarged perspective view of a second frame of the multi-piece frame of FIG. 2.
Figure 8:
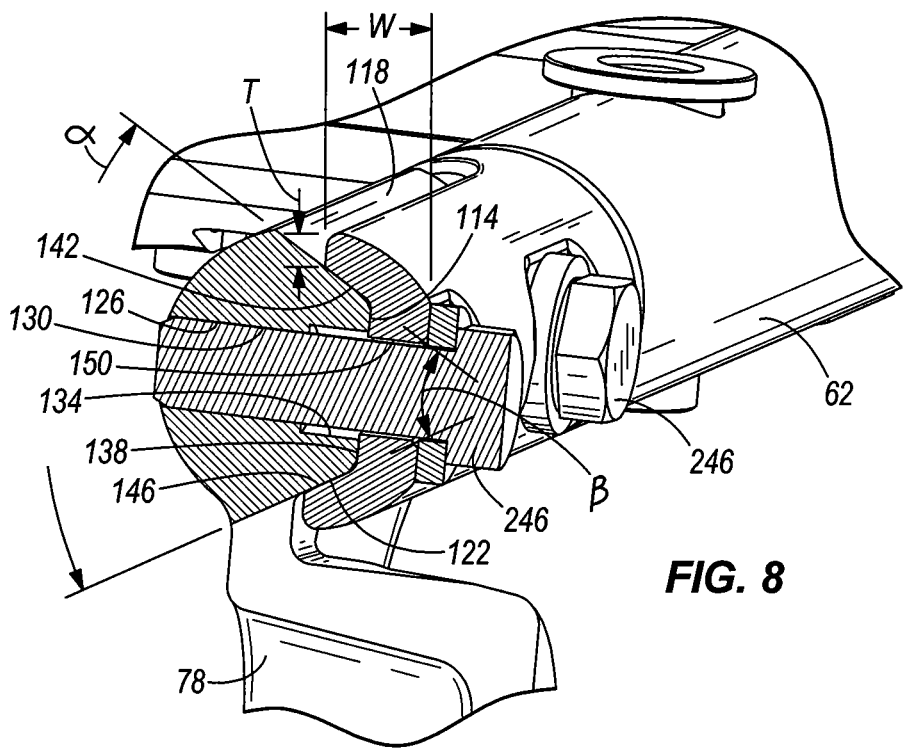
FIG. 8 is a cross-sectional view through the multi-piece frame of FIG. 2, taken along line 8-8 in FIG. 3.

With reference to FIG. 6, the coupling portion 106b includes a substantially planar coupling face or surface 138, a wall 142 extending from the top edge of the coupling surface 138 at an oblique angle with respect to the coupling surface 138, and a wall 146 extending from the bottom edge of the coupling surface 138 at an oblique angle with respect to the coupling surface 138. As previously described, the coupling portion 106b is configured as a recess, such that the walls 142, 146 face inwardly and toward each other on the mount 102a. In the illustrated construction of the coupling portion 106b, the coupling surface 138 and the wall 142 share a common top edge, and the coupling surface 138 and the wall 146 share a common bottom edge. Alternatively, the coupling portion 106b may be configured to include a blended surface between the coupling surface 138 and the wall 142, and a blended surface between the coupling surface 138 and the wall 146, respectively. The coupling portion 106b also includes dual coupling apertures 150 extending through the mount 102a. As shown in FIG. 8, the apertures 150 are non-threaded.

With continued reference to FIG. 8, the walls 118, 122 of the mounting portion 106a define an included angle $\beta$ of about 58 degrees, and the walls 142, 146 of the coupling portion 106b define an included angle $\beta$ of about 50 degrees to facilitate wedging of the mounting portion 106a against the coupling portion 106b, discussed in more detail below. Alternatively, any of a number of different combinations of included angles of the walls 118, 122 and included angles of the walls 142, 146 may be utilized to facilitate wedging of the mounting portion 106a against the coupling portion 106b.

Figure 7:
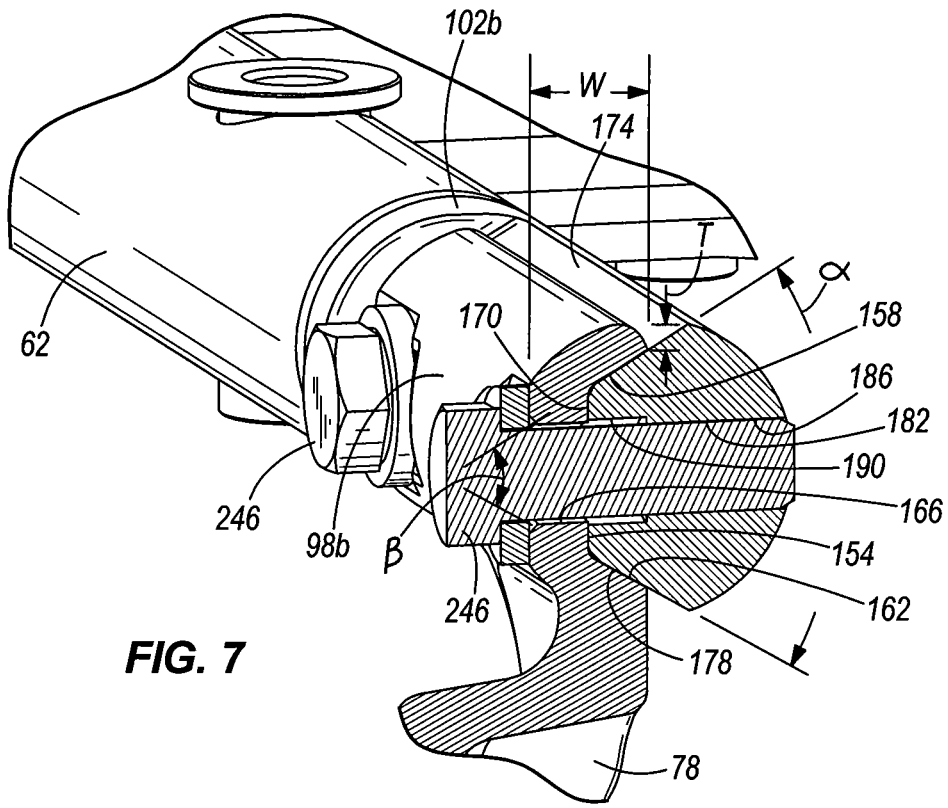
FIG. 7 is a cross-sectional view through the multi-piece frame of FIG. 2, taken along line 7-7 in FIG. 2.

With reference to FIGS. 4 and 5, the mounting portion 110a includes a substantially planar mounting face or surface 154, a wall 158 extending from a top edge of the mounting surface 154 at an oblique angle with respect to the mounting surface 154, and a wall 162 extending from a bottom edge of the mounting surface 154 at an oblique angle with respect to the mounting surface 154. As previously described, the mounting portion 110a is configured as a recess, such that the walls 158, 162 face inwardly and toward each other on the mount 98b. In the illustrated construction of the mounting portion 110a, the mounting surface 154 and the wall 158 share a common top edge, and the mounting surface 154 and the wall 162 share a common bottom edge. Alternatively, the mounting portion 110a may be configured to include a blended surface between the mounting surface 154 and the wall 158, and a blended surface between the mounting surface 154 and the wall 162, respectively. The mounting portion 110a also includes dual apertures 166 extending through the mount 98b. As shown in FIG. 7, the apertures 166 are non-threaded.

With reference to FIG. 4, the coupling portion 110b includes a substantially planar coupling face or surface 170, a wall 174 extending from the top edge of the coupling surface 170 at an oblique angle with respect to the coupling surface 170, and a wall 178 extending from the bottom edge of the coupling surface 170 at an oblique angle with respect to the coupling surface 170. As previously described, the coupling portion 110b is configured as a projection, such that the walls 174, 178 face outwardly on the mount 102b. In the illustrated construction of the coupling portion 110b, the coupling surface 170 and the wall 174 share a common top edge, and the coupling surface 170 and the wall 178 share a common bottom edge. Alternatively, the coupling portion 110b may be configured to include a blended surface between the coupling surface 170 and the wall 174, and a blended surface between the coupling surface 170 and the wall 178, respectively. The coupling portion 110b also includes dual coupling apertures 182 extending through the mount 102b. Each aperture 182 includes a threaded bore 186 spaced axially inwardly from the coupling surface 170 and a counter-bore 190 extending between the threaded bore 186 and the coupling surface 170 (see FIG. 7).

With continued reference to FIG. 7, the walls 174, 178 of the coupling portion 110b define an included angle α of about 58 degrees, and the walls 158, 162 of the mounting portion 110a define an included angle β of about 50 degrees to facilitate wedging of the coupling portion 110b against the mounting portion 110a, discussed in more detail below. Alternatively, any of a number of different combinations of included angles of the walls 174, 178 and included angles of the walls 158, 162 may be utilized to facilitate wedging of the coupling portion 110b against the mounting portion 110a.

With reference to FIG. 5, the mount 98c includes a substantially planar mounting face or surface 194 and an aperture 198 extending through the mount 98c. The aperture 198 includes a threaded bore 202 spaced axially inwardly from the mounting surface 194 and a counter-bore 206 extending between the threaded bore 202 and the mounting surface 194 (see FIG. 10). With reference to FIG. 4, the mount 102c includes a substantially planar coupling face or surface 210 and a non-threaded aperture 214 extending through the mount 102c (see also FIG. 10).

With reference to FIG. 5, the mount 98d includes a substantially planar mounting face or surface 218 and a non-threaded aperture 222 extending through the mount 98d. With reference to FIG. 4, the mount 102d includes a substantially planar coupling face or surface 226 and an aperture 230 extending through the mount 102d (see FIG. 10). The aperture 230 includes a threaded bore 234 spaced axially inwardly from the coupling surface 226 and a counter-bore 238 extending between the threaded bore 234 and the coupling surface 226.

Figure 9:
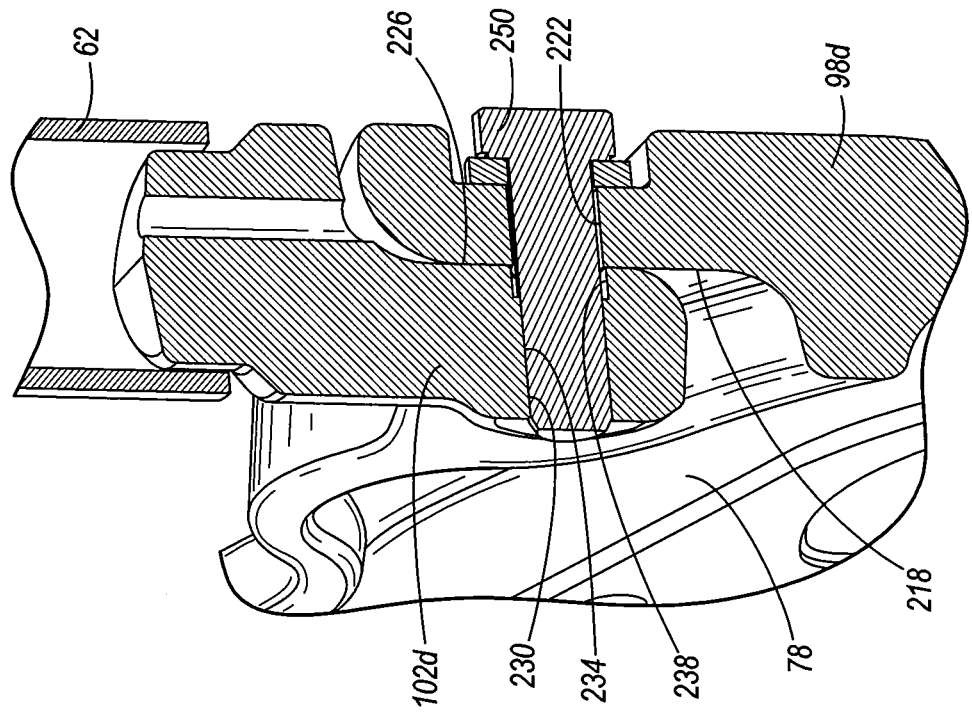
FIG. 9 is a cross-sectional view through the multi-piece frame of FIG. 2, taken along line 9-9 in FIG. 2.
Figure 10:
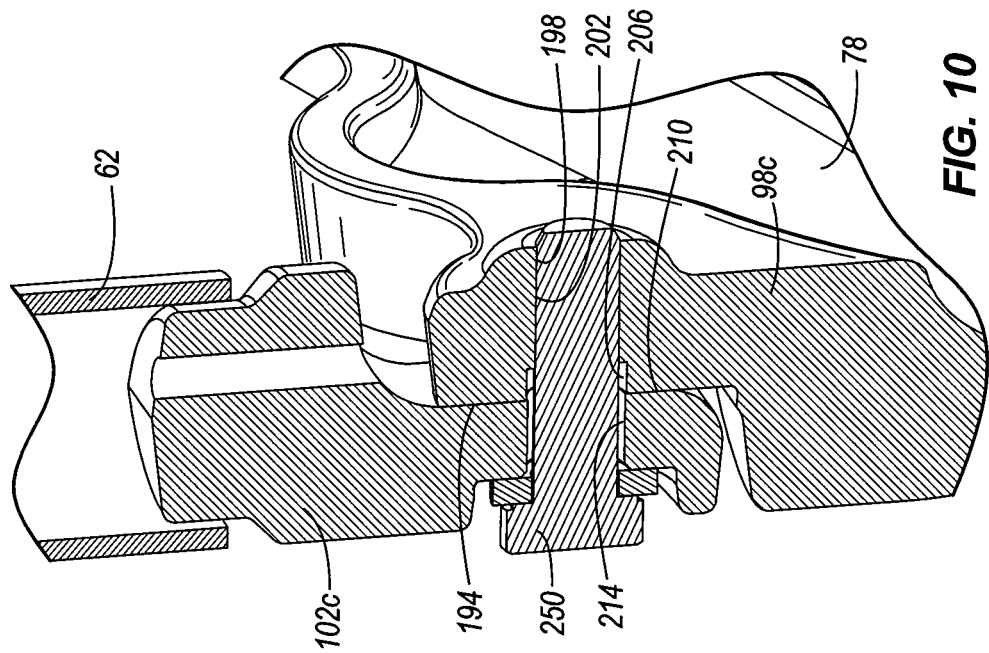
FIG. 10 is a cross-sectional view through the multi-piece frame of FIG. 2, taken along line 10-10 in FIG. 3.

With reference to FIGS. 6, 9, and 10, each of the mounts 102a, 102b is coupled to a corresponding frame member 88 of the tail frame 62, and each of the mounts 102c, 102d is coupled to a corresponding frame member 90 of the tail frame 62 (e.g., by welding, using a press-fit, etc.). Alternatively, each of the mounts 102a-102d may be formed integrally as a single piece with the corresponding frame members 88, 90 of the tail frame 62.

With reference to FIGS. 4-6, the mounting portion 106a is outboard-facing with respect to a longitudinal axis 242 of the frame 18, while the coupling portion 106b is inboard-facing with respect to the longitudinal axis 242. However, the mounting portion 110a is inboard-facing with respect to the longitudinal axis 242, while the coupling portion 110b is outboard-facing with respect to the longitudinal axis 242. As a result, the tail frame 62 may be assembled to the main frame 58 by bringing into engagement the coupling portion 106b and the mounting portion 106a in a direction substantially transverse to the longitudinal axis 242 (see FIG. 4). Likewise, the tail frame 62 may be assembled to the main frame 58 by bringing into engagement the coupling portion 110b and the mounting portion 110a in a direction substantially transverse to the longitudinal axis 242. In this manner, the mounts 98a-98d are brought into engagement substantially simultaneously with the respective mounts 102a-102d in anticipation of fastening the tail frame 62 to the main frame 58.

With reference to FIG. 7, fasteners 246 (e.g., a threaded bolt and washer) are inserted through the apertures 166 in the mount 98b, and then inserted into the counter-bore 190 of the corresponding aligned coupling aperture 182 in the mount 102b. The fasteners 246 may be hand-tightened into the threaded bores 186 of the respective coupling apertures 182, causing the walls 174, 178 of the coupling portion 110b to engage or wedge against the respective walls 158, 162 of the mating mounting portion 110a. In a similar manner as shown in FIG. 8, fasteners 246 are inserted through the apertures 150 in the mount 102a, and then inserted into the counter-bore 134 of the corresponding aligned mounting aperture 126 in the mount 98a. The fasteners 246 may be hand-tightened into the threaded bores 130 of the respective mounting apertures 126, causing the walls 142, 146 of the coupling portion 106b to engage or wedge against the respective walls 118, 122 of the mating mounting portion 106a.

With reference to FIGS. 7 and 8, the fasteners 246 may be further tightened using conventional hand tools (e.g., wrenches or ratcheting sockets), causing the walls 142, 146 of the coupling portion 106b and the walls 158, 162 of the mounting portion 110a to deflect outwardly to allow the coupling surface 138 to engage the mounting surface 114, and to allow the coupling surface 170 to engage the mounting surface 154 to increase the dimensional stability of each of the joints created by attached mounts 98a, 102a and attached mounts 98b, 102b, respectively. The thickness "T" of each of the mounts 102a, 98b at a location adjacent the coupling portion 106b and the mounting portion 110a, respectively, should be proportional to the overall width "W" of each of the mounts 102a, 98b so that the walls 142, 146, 158, 162 of the respective mounts 102a, 98b may be allowed to deflect outwardly at a desired torque setting of the fasteners 246 to allow the coupling surface 138 to engage the mounting surface 114, and to allow the coupling surface 170 to engage the mounting surface 154. In the illustrated construction of the mounts 102a, 98b, the proportion of the overall width W of each of the mounts 102a, 98b to the thickness T of each of the mounts 102a, 98b is about 2:1.

With reference to FIG. 9, a fastener 250 (e.g., a threaded bolt and washer) is inserted through the aperture 222 in the mount 98d, and then inserted into the counter-bore 238 of the aligned aperture 230 in the mount 102d. The fastener 250 may be hand-tightened into the threaded bore 234, then tightened using conventional hand tools. Likewise, with reference to FIG. 10, another fastener 250 is inserted through the aperture 214 in the mount 102c, and then inserted into the counter-bore 206 of the aligned aperture 198 in the mount 98c. The fastener 250 may be hand-tightened into the threaded bore 202, then tightened using conventional hand tools.

The joints formed by interlocking or wedging the mounting portion 106a against the coupling portion 106b, and the coupling portion 110b against the mounting portion 110a, allow bending or shear loads applied to the tail frame 62 to be directly transferred to the rear frame members 78 and the remainder of the main frame 58, rather than passing through the fasteners 246 themselves. Specifically, suspension loading or forces exerted on the main frame 58 by the suspension components 90 are initially directed through the tail frame 62 and the mounts 102a-102b before being transferred to the main frame 58 via the mounts 98a, 98b. As a result, the fasteners 246 are almost exclusively maintained in axial tension, irrespective of bending or shear loads that are applied to the tail frame 62.

The joints formed by interlocking or wedging the mounting portion 106a against the coupling portion 106b, and the coupling portion 110b against the mounting portion 110a, also allow larger loads to be applied to the tail frame 62 (e.g., allowing heavier saddle bags) without increasing the clamping force between the tail frame 62 and the main frame 58. In addition, the joints formed by interlocking or wedging the mounting portion 106a against the coupling portion 106b, and the coupling portion 110b against the mounting portion 110a, allow the tail frame 62 to transfer bending or shear loads applied to the tail frame 62 directly to the main frame 58 with little clamping force between the tail frame 62 and main frame 58. Further, the joints formed by interlocking or wedging the mounting portion 106a against the coupling portion 106b, and the coupling portion 110b against the mounting portion 110a, accommodate variations in size of the mounting portions 106a, 110a and coupling portions 106b, 110b that may be caused by variations in the thickness of paint applied to either the tail frame 62 or the main frame 58.

The joints formed by interlocking or wedging the mounting portion 106a against the coupling portion 106b, and the coupling portion 110b against the mounting portion 110a, also allow different size rear fenders, requiring differently-configured tail frames 62 with different-width fender supports 94, to be coupled to the same main frame 58. Therefore, manufacturers may utilize the same main frame 58 in assembling motorcycles having standard-size rear tires and accompanying rear fenders, and in assembling motorcycles having wider rear tires and accompanying wider rear fenders. Consumers purchasing the motorcycle having the standard-size rear tire and rear fender can also easily replace the standard-size tire and rear fender with a wider tire and accompanying rear fender, without having to modify the main frame 58 in any way to accommodate the wider rear tire and accompanying rear fender.

Various features of the invention are set forth in the following claims.

What is claimed is:

1. A motorcycle frame comprising:
    a first frame portion including
        a steering head;
        at least one longitudinal frame member extending rearwardly from the steering head;
        a first mounting portion coupled to the longitudinal frame member and having a recess;
        a second mounting portion coupled to the longitudinal frame member and having a projection;
    a second frame portion fastened to the first frame portion, the second frame portion including
        a first coupling portion having a projection at least partially received within the recess of the first mounting portion; and
        a second coupling portion having a recess into which the projection of the second mounting portion is at least partially received.

2. The motorcycle frame of claim 1, wherein the recess of the first mounting portion is defined by a mounting surface, and first and second walls extending from the mounting surface at an oblique angle to the mounting surface, and wherein the projection of the first coupling portion is defined by a coupling surface, and first and second walls extending from the coupling surface at an oblique angle to the coupling surface.

3. The motorcycle frame of claim 2, wherein the first and second walls of the first mounting portion are wedged against the first and second walls of the first coupling portion, respectively, to substantially prevent rotation of the second frame portion with respect to the first frame portion.

4. The motorcycle frame of claim 2, wherein the recess of the second coupling portion is defined by a second coupling surface, and first and second walls extending from the second coupling surface at an oblique angle to the second coupling surface, and wherein the projection of the second mounting portion is defined by a second mounting surface, and first and second walls extending from the second mounting surface at an oblique angle to the second mounting surface.

5. The motorcycle frame of claim 4, wherein the first and second walls of the second mounting portion are wedged against the first and second walls of the second coupling portion, respectively, to substantially prevent rotation of the second frame portion with respect to the first frame portion.

6. The motorcycle frame of claim 1, wherein the first mounting portion includes an inboard surface, and wherein the first coupling portion includes an outboard surface engaged with the inboard surface of the first mounting portion.

7. The motorcycle frame of claim 6, wherein the first coupling portion includes a threaded aperture configured to receive a threaded fastener to secure the first mounting portion to the first coupling portion.

8. The motorcycle frame of claim 6, wherein the second mounting portion includes an outboard surface, and wherein the second coupling portion includes an inboard surface engaged with the outboard surface of the second mounting portion.

9. The motorcycle frame of claim 8, wherein the second mounting portion includes a threaded aperture configured to receive a threaded fastener to secure the second mounting portion to the second coupling portion.

10. A motorcycle frame comprising:
    a first frame portion including
        a steering head;
        at least one longitudinal frame member extending rearwardly from the steering head;

a first mounting portion coupled to the longitudinal frame member;

a second mounting portion coupled to the longitudinal frame member, the first and second mounting portions having respective inboard surfaces in facing relationship with each other and respective outboard surfaces;

a second frame portion fastened to the first frame portion, the second frame portion including a first coupling portion engaged with the inboard surface of the first mounting portion; and a second coupling portion engaged with the outboard surface of the second mounting portion, wherein the first mounting portion includes one of a projection and a recess defining a first mating interface, and the first coupling portion includes the other of the projection and the recess defining the first mating interface, and wherein the second mounting portion includes one of a projection and a recess defining a second mating interface, and the second coupling portion includes the other of the projection and the recess defining the second mating interface.

11. The motorcycle frame of claim 10, wherein the first mounting portion includes the recess, and wherein the first coupling portion includes the projection at least partially received within the recess of the first mounting portion.

12. The motorcycle frame of claim 11, wherein the recess of the first mounting portion is defined by a mounting surface, and first and second walls extending from the mounting surface at an oblique angle to the mounting surface, wherein the projection of the first coupling portion is defined by a coupling surface, and first and second walls extending from the coupling surface at an oblique angle to the coupling surface, and wherein the first and second walls of the first mounting portion are wedged against the first and second walls of the first coupling portion, respectively, to substantially prevent rotation of the second frame portion with respect to the first frame portion.

13. The motorcycle frame of claim 11, wherein the second mounting portion includes the projection, and wherein the second coupling portion includes the recess into which the projection of the second mounting portion is at least partially received.

14. The motorcycle frame of claim 13, wherein the recess of the second coupling portion is defined by a second coupling surface, and first and second walls extending from the second coupling surface at an oblique angle to the second coupling surface, wherein the projection of the second mounting portion is defined by a second mounting surface, and first and second walls extending from the second mounting surface at an oblique angle to the second mounting surface, and wherein the first and second walls of the second mounting portion are wedged against the first and second walls of the second coupling portion, respectively, to substantially prevent rotation of the second frame portion with respect to the first frame portion.

15. The motorcycle frame of claim 10, wherein the second mounting portion includes a threaded aperture configured to receive a threaded fastener to secure the second mounting portion to the second coupling portion.

16. The motorcycle frame of claim 10, wherein the first coupling portion includes a threaded aperture configured to receive a threaded fastener to secure the first mounting portion to the first coupling portion.

17. A tail frame adapted to be coupled to a main frame of a motorcycle, the main frame including a steering head, at least one longitudinal frame member extending rearwardly from the steering head, a first mounting portion coupled to the longitudinal frame member and having a recess, and a second mounting portion coupled to the longitudinal frame member and having a projection, the tail frame comprising:

a first frame member including a first coupling portion having a projection at least partially received within the recess of the first mounting portion; and a second frame member including a second coupling portion having a recess into which the projection of the second mounting portion is at least partially received.

18. The tail frame of claim 17, wherein the projection of the first coupling portion is defined by a coupling surface, and first and second walls extending from the coupling surface at an oblique angle to the coupling surface.

19. The tail frame of claim 18, wherein the first and second walls of the first coupling portion are configured to wedge against respective first and second walls of the first mounting portion to substantially prevent rotation of the tail frame with respect to the main frame.

20. The tail frame of claim 18, wherein the recess of the second coupling portion is defined by a second coupling surface, and first and second walls extending from the second coupling surface at an oblique angle to the second coupling surface.

21. The tail frame of claim 20, wherein the first and second walls of the second coupling portion are configured to wedge against respective first and second walls of the second mounting portion to substantially prevent rotation of the tail frame with respect to the main frame.

22. The tail frame of claim 17, wherein the first coupling portion includes an outboard surface configured to engage with an inboard surface of the first mounting portion.

23. The tail frame of claim 22, wherein the first coupling portion includes a threaded aperture configured to receive a threaded fastener to secure the first coupling portion to the first mounting portion.

24. The tail frame of claim 22, wherein the second coupling portion includes an inboard surface configured to engage with an outboard surface of the second mounting portion.

25. The tail frame of claim 17, further comprising:

a third frame member coupled to the first frame member and oriented at an oblique included angle relative to at least a portion of the first frame member; and a fourth frame member coupled to the second frame member and oriented substantially parallel with the third frame member.

26. A tail frame adapted to be coupled to a main frame of a motorcycle, the main frame including a steering head, at least one longitudinal frame member extending rearwardly from the steering head, a first mounting portion coupled to the longitudinal frame member, and a second mounting portion coupled to the longitudinal frame member, the first and second mounting portions having respective inboard surfaces in facing relationship with each other and respective outboard surfaces, the tail frame comprising:

a first frame member including a first coupling portion engaged with the inboard surface of the first mounting portion;

a second frame member including a second coupling portion engaged with the outboard surface of the second mounting portion;

a third frame member coupled to the first frame member and oriented at an oblique included angle relative to at least a portion of the first frame member; and a fourth frame member coupled to the second frame member and oriented substantially parallel with the third frame member, wherein the first coupling portion includes a projection configured to be at least partially received within a recess of the first mounting portion, and wherein the second coupling portion includes a recess configured to at least partially receive a projection of the second mounting portion.

27. The tail frame of claim 26, wherein the projection of the first coupling portion is defined by a coupling surface, and first and second walls extending from the coupling surface at an oblique angle to the coupling surface, and wherein the first and second walls of the first coupling portion are configured to wedge against respective first and second walls of the first coupling portion to substantially prevent rotation of the tail frame with respect to the main frame.

28. The tail frame of claim 26, wherein the recess of the second coupling portion is defined by a second coupling surface, and first and second walls extending from the second coupling surface at an oblique angle to the second coupling surface, and wherein the first and second walls of the second coupling portion are configured to wedge against respective first and second walls of the second mounting portion to substantially prevent rotation of the tail frame with respect to the main frame.

29. The tail frame of claim 26, wherein the second coupling portion includes a threaded aperture configured to receive a threaded fastener to secure the second coupling portion to the second mounting portion.

\* \* \* \* \*